US007335011B2

(12) United States Patent
Zoppas

(10) Patent No.: US 7,335,011 B2
(45) Date of Patent: Feb. 26, 2008

(54) DEVICE AND METHOD FOR COMPRESSION MOULDING PLASTIC CONTAINERS

(75) Inventor: Matteo Zoppas, Fontana Fredda (IT)

(73) Assignee: S.I.P.A. Societá Industrializzazione Progettazione Automazione S.p.A., Vittorio Veneto (IT)

( * ) Notice: Subject to any disclaimer, the term of this patent is extended or adjusted under 35 U.S.C. 154(b) by 376 days.

(21) Appl. No.: 10/505,908

(22) PCT Filed: Feb. 27, 2003

(86) PCT No.: PCT/EP03/02018

§ 371 (c)(1),
(2), (4) Date: Aug. 26, 2004

(87) PCT Pub. No.: WO03/072333

PCT Pub. Date: Sep. 4, 2003

(65) Prior Publication Data

US 2005/0158421 A1 Jul. 21, 2005

(30) Foreign Application Priority Data

Feb. 27, 2002 (IT) .................. RM2002A0099

(51) Int. Cl.
*B29C 43/08* (2006.01)
*B29C 43/50* (2006.01)
*B29C 49/02* (2006.01)

(52) U.S. Cl. .................. 425/348 R; 425/350; 425/412; 425/422; 425/528

(58) Field of Classification Search ................ 425/525, 425/528, 348 R, 350, 412, 420, 422, 438
See application file for complete search history.

(56) References Cited

U.S. PATENT DOCUMENTS

| 2,744,288 | A | | 5/1956 | Fienberg et al. |
| 2,811,815 | A | | 11/1957 | Eldred |
| 2,981,976 | A | * | 5/1961 | Maier .................... 425/417 |
| 3,337,910 | A | * | 8/1967 | West ..................... 425/181 |
| 3,375,553 | A | * | 4/1968 | Criss .................... 425/412 |
| 3,511,845 | A | * | 5/1970 | Scalora ................. 264/294 |
| 4,832,592 | A | * | 5/1989 | Saumsiegle ............ 425/525 |
| 6,416,312 | B1 | | 7/2002 | Gonser et al. |
| 2002/0098310 | A1 | * | 7/2002 | Kikuchi et al. ......... 428/36.91 |

FOREIGN PATENT DOCUMENTS

| CH | 664526 A5 | 3/1988 |
| WO | WO01/31990 A1 | 5/2001 |
| WO | WO01/32390 A1 | 5/2001 |

* cited by examiner

*Primary Examiner*—Robert B. Davis
(74) *Attorney, Agent, or Firm*—Simpson & Simpson, PLLC

(57) ABSTRACT

A compression-moulding press for moulding plastic containers (P) consisting of a moulding cavity formed by a plunger (5), a female mould (14), and two separable lips (7, 8). A cylinder (16) slides inside a sliding slide (22) to keep the lips (7, 8) closed. The plunger (5) slides inside the cylinder (16), with respect to both the cylinder (16) and the slide (22), when moulding the containers (P). Finally, a method for making plastic containers by means of compression moulding using said device is also described.

8 Claims, 10 Drawing Sheets

DEVICE AND METHOD FOR COMPRESSION MOULDING PLASTIC CONTAINERS

CROSS REFERENCE TO RELATED APPLICATIONS

The present application is the U.S. national stage application pursuant to 35 U.S.C. §371 of International Application No. PCT/EP03/02018, filed Feb. 27, 2003, which application claims benefit of Italian Application No. RM2002A000099, filed on Feb. 27, 2002.

FIELD OF THE INVENTION

This invention relates to a device and a method for compression moulding of plastic items. More particularly, it is especially suitable for moulding parisons for making plastic bottles, pots, containers, or similar items through blow moulding.

PRIOR ART

The parisons for making blow-moulded containers, especially made of PET, are normally made by means of injection, compression, or extrusion moulding.

Adopting compression moulding for the production of parisons has the following advantages over injection moulding:

Lower moulding temperature and pressure, and, thus, a lower level of residual acetaldehyde in the finished bottle—acetaldehyde also contributes to the unpleasant apple taste found, for example, in bottles of mineral water stored in hot warehouses for a long time.
 Less degradation of the plastic material due to the breakage of its polymeric chains.
 Less mechanical stress due to the lower moulding pressure, and, thus, a smaller press.
 Elimination of injection-point defects on the finished parison that cause quality problems and the explosion of bottles in the next blow-moulding operation.
 Easier pairing of the moulding station with the rest of the plant, which generally includes machines that operate continuously.
 Elimination of the storing areas.
 Filling the different moulding cavities with more uniform doses and at more uniform temperatures.

Normally, during compression moulding, a predetermined amount of plastic material, in fluid or pasty form, is deposited in the cavity of a mould. Then, the mould is closed, and the plastic is shaped by pressing it as desired. Differently from injection moulding, after closing the mould, the moulding cavity does not communicate—for example, with a plasticization screw—with the external environment, rather it remains isolated without exchanging plastic material or air; normally, this means that the moulding cavity is filled with a dose that is slightly less that the maximum theoretical amount. This, together with the contraction in volume of the plastic due to cooling in the moulding cavity, makes it difficult to obtain moulded pieces with particularly precise sizing tolerances.

This makes it difficult to compression mould objects such as parisons for processing later through blow moulding, which must have quite precise sizing tolerances and shapes; in fact, filling errors, bubbles, and other geometric irregularities can lead to explosions in the blow-moulding phase. Furthermore, the shrinkage of the plastic material in the neck and threading areas of the parison can lead to unacceptable appearance problems and problems when screwing the bottle cap.

In accordance with a Swiss patent, CH 664 526 (Maegerle), said problems are tackled when compression-moulding plastic tubes for packaging toothpaste with a press where the moulding plunger is kept under pressure during the cooling phase of the plastic. In this way, the plunger continues its stroke compensating for the thermal shrinkage of the plastic material, which is constantly compressed against the walls of the moulding cavity; the finished workpieces have a better sizing precision.

On the downside, taking into account the shrinkage of the material during compression by increasing the pressure of the plunger makes it harder to remove the object after cooling. This results in a rather widespread problem where, when compression-moulding objects such as parisons for blow-moulding containers, it is necessary to use notable force in order to extract the plunger, which shapes the internal cavity of the parisons, from the parison after cooling.

Various compression-moulding operations are known for making relatively small plastic objects such as caps for bottles, but these solutions are not immediately applicable for making large or deep plastic containers that generally require high outputs.

OBJECTS OF THE INVENTION

It is an object of this invention to provide a device and a method for compression-moulding plastic items that resolves the aforementioned problems, especially with regard to the force required to release the moulded workpiece at the end of the moulding cycle and the removal of the workpiece from the moulding station.

In accordance with a first aspect of the invention, these objects are achieved by means of a device for compression-moulding plastic containers, having an internal cavity communicating with the outside through an opening, featuring, in accordance with claim 1, a mould comprising a plunger to shape at least part of said internal cavity of the container and a female mould to shape part of the external surface of the container. Said plunger and female mould are able to reach a coupling position in order to shape the workpiece by sliding in the opening or closing direction of the mould. The assembly also features at least two moving completion elements to finish said external surface of the moulding cavity. The assembly also includes a slide, which slides in the opening or closing direction of the mould, equipped with a cylindrical cavity and a cylinder able to slide inside the cylindrical cavity in the opening or closing direction of the mould and to keep the mould in the closed position by applying a force on said completion elements; furthermore, the plunger can slide along the opening or closing direction of the mould inside the cylinder for at least a segment of its length with respect to said cylinder and said slide.

In accordance with an other aspect of the invention, these objects are achieved by means of a method for moulding plastic containers, implemented by means of a device described above, which in accordance with claim 9, comprises the following stages:

a) Filling a cavity of a female mould with a dose of fluid plastic;
 b) Feeding the slide with the cylinder and the plunger toward said female mould;
 c) Closing the completion elements between said female mould and said cylinder;

d) Closing the mould and compression moulding the container by advancing the plunger inside the female mould;

e) Applying an appropriate continuous compression force on the plunger in order to further sink the plunger into the plastic, depending on the contraction in volume, in order to compensate for thermal shrinkage during cooling;

f) Detaching the plunger from the cavity of the female mould making it slide with a first stroke along said mould-opening and/or closing direction while said cylinder and said completion elements remain in the closed-mould position.

The fact of having a moulding unit with a sliding plunger, at least in the mould-opening and closing direction, with respect to the compression cylinder and the sliding slide, makes it possible and more convenient to use a gas spring system in order to operate the compression cylinder. In fact, the gas spring system is simpler, less expensive, and has faster response times compared to a system using, for example, an oleo or pneumatic system to operate a compression cylinder, while still being able to apply high compression forces. Furthermore, said gas spring makes it possible to unload the moulded workpiece, and in particular to remove the plunger from even a deep-moulded object, at faster speeds than not having a plunger essentially integral with the sliding slide.

According to the above method, the plunger is detached from the moulded object—which requires the greatest force in the mould-opening phase—using the slide actuators. The slide actuators are also used to keep closed the other parts of the mould during the detachment of the plunger: in this way, it is possible to avoid useless oversizing of the removing actuators. Finally, the mould and its moving members—for example, the lips and the bar of the lips—are stressed optimally and wear better.

BRIEF DESCRIPTION OF THE DRAWINGS

Other advantages of the invention will be readily apparent from the more detailed description of a particular version of the invention, given as a nonlimiting example and in conjunction with the following accompanying drawings.

DETAILED DESCRIPTION OF THE INVENTION

In the following description, the terms "continuously operated press" and "continuously operated moulding unit" are used to refer to a device where the moulding cycle is carried out in several moulding cavities with a timing difference between the different cavities: for example, while a moulding cavity is opened to be filled, another unit is closing to compress, and a third unit is opened to remove the moulded workpiece. The terms "sequential press" and "sequential moulding unit" refer to a moulding device where the moulding cycle is executed simultaneously and without timing differences between the different moulding cavities: for example, all the moulding cavities are filled, or closed to compress, or opened to remove the moulded workpieces.

Figure 1:
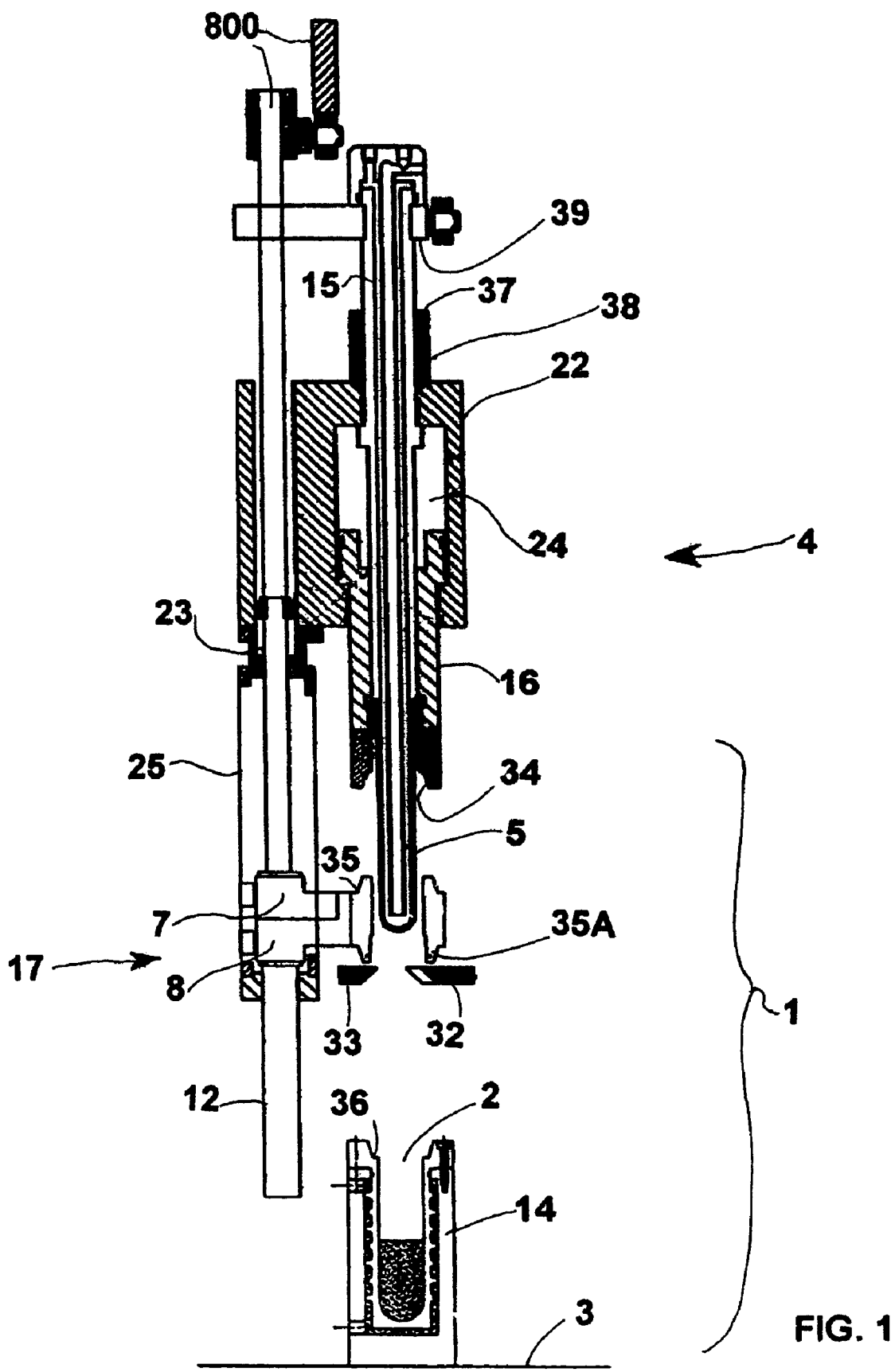
FIGS. 1 through 8 show a schematic view of the vertical sections of a preferred version of a device for compression-moulding plastic objects in accordance with this invention during some phases of a moulding operation.

FIG. 1 shows a mould 1 suitable for compression mould of plastic objects comprising a female mould 14 where there is a moulding cavity 2 for depositing some plastic, for example, PET, PP, PS, PE, PVC, PEN, PBT, etc., in fluid form or in a consistency suitable for moulding.

The female mould is fixed onto the bottom mould-holding plate 3 of a moulding unit 4 in accordance with this invention. Several units 4 similar or identical to the one shown in FIGS. 1 through 8 are fitted onto a support that rotates around a vertical axis in order to create a rotary carousel for compression moulding plastic objects that, according to the preferred version of this invention, are parisons suitable to be transformed, with a subsequent blow-moulding operation, into bottles for mineral water, drinks, or fruit juices, pots for example, for storing preserved food, or other types of containers.

The mould 1 also includes an essentially cylindrical plunger 5 in a lengthened shape suitable to define the shape of the internal cavity 6 of the parison or moulded object P, and two completion elements 7, 8, shown more clearly in detail in FIGS. 9 through 11, which will be called "lips" hereinafter. These lips are used to shape the known type of mouth and neck of the parison: in particular, the outside of the threaded end of the container—the round protrusion called "ring" and the round protrusion called "sealing ring" on which any tear sealing rings of the bottle cap are fastened. In order to be able to extract the parison from the mould, the lips 7, 8 are separated from each other by a mould-dividing surface in the form of a vertical surface, and open and close together with a horizontal movement, or anyhow transversal to the approach stroke of the plunger to the female mould. The direction of said stroke will be called "mould-opening and/or closing direction" hereinafter, meaning the main mould-opening/closing direction, referring to the approach direction of the larger elements of the mould.

The scope of this invention also covers completion devices, instead of the lips 7, 8, that have an equivalent function and can be detached from the moulded object P with a movement at least transversal to the opening and/or closing direction of the mould.

Figure 11:
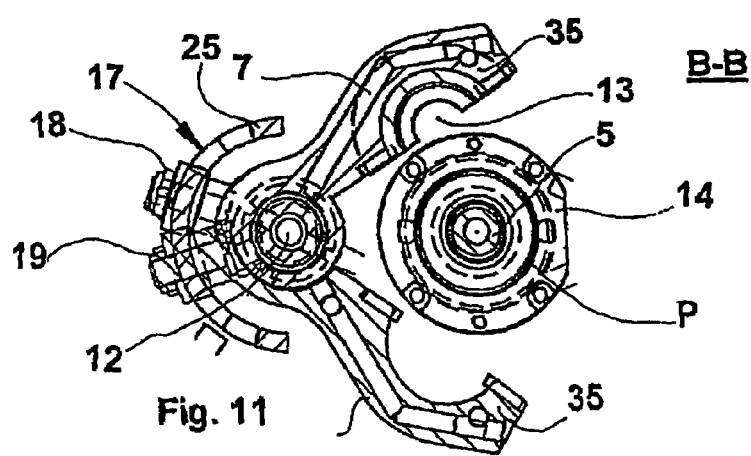
FIG. 11 shows a section view along the B-B plane of the detail shown in FIG. 10.

In accordance with the preferred version of the invention shown in the attached Figures, the lips 7, 8 open and touch each other rotating around a vertical bar 12, FIG. 11, creating a type of scissor-like mechanism.

The shape of the lips 7, 8 is suitable to create, when closed, a hole 13 within which the plunger 5 can be fed with a sliding movement.

When the mould is closed FIGS. 3 through 6, the two lips touch each other and rest on the female mould 14, and the plunger 5 is fit into the hole 13.

Preferably the vertical bar 12, which acts as hinge for the lips, is placed in the part of the unit 4 facing the inside of the rotary carousel, while the parts of the lips that define the hole 13 are in a position that is more external with respect to the bar 12: this arrangement makes it easier to reach the core of the mould 1 with filling devices and devices for removing the moulded parisons, and is particularly appropriate for moulding stations consisting of many moulding units 4 operating continuously, rather than sequentially.

Ideally, the plunger 5 is fastened to, or is machined from, a plunger-holding bar 15 that serves to move the plunger.

The lips 7, 8 are blocked axially onto the bar 12, and can be raised and lowered by making the bar 12 slide according to the opening or closing direction of the mould.

Preferably, during moulding, a hollow cylindrical element, or hollow piston 16—hereinafter referred to as "hollow presser" or compression cylinder 16 FIG. 1—slides vertically and compresses the lips 7, 8 closed against the female mould 14, preventing the mould 1 from opening due to the internal moulding pressure. To accomplish this, the hollow presser 16 and the top end of the female mould 14 ideally both have a housing in the shape similar to a truncated cone 34 and 36, respectively, or anyhow operating according to the principle of an inclined plane, apt to couple with the shape of a truncated cone 35 and 35A, respectively of the closed lips 7, 8 so that the compression force exerted by the hollow presser 16 and by the female mould 14 tends to keep the lips closed.

Alternatively, the lips can be more than two and kept closed with the compression cylinder 16, or with other appropriate pressing means not necessarily hollow able to keep the mould 1 closed by applying a compressing or closing force at least on the lips.

The sliding slide 22 consists of a support apt to slide at least according to the opening and closing direction of the mould. In the example shown in the Figures, said slide is positioned above the female mould 14 and the bottom mould-holding plate 3 and can go up or down—for example, thanks to a cam-type operation, not shown—with a preferably vertical stroke, while—as shown in the example—the bottom mould-holding plate 3 is at a fixed height and can only rotate around a vertical axis driven by the moulding carousel.

According to a first aspect of this invention, the plunger 5 and the plunger-holding bar 15 can slide along the mould-opening and/or closing direction with respect to the hollow presser or compression cylinder 16 and with respect to the slide 22.

The bar 15 of the plunger 5 slides in the cylindrical internal cavity of the hollow presser 16 with a movement independent from the movement of the latter, as is described more in detail below.

Preferably, the horizontal opening and closing movement of the lips 7, 8 is controlled by a cam-type device 17—better shown in FIGS. 1, 9, 10, and 11. Two wheels 18, 19, each rotating around a pin integral with the lips 7, 8, slide along two slits 20 and 21, respectively that define the sliding shape of the cam.

Preferably, the sliding housings of the bars 12, 15 and of the hollow presser 16 are machined from a single slide 22 FIG. 1. Preferably, the two slits 20, 21 of the cam, which controls the opening of the lips, are machined from a plate 25, for example made of steel FIG. 11, fastened rigidly to the slide 22.

The sliding between the bar 12 of the lips and the slide 22 is controlled by a cam-800 operation and by the cylindrical chamber 23, also machined from the slide 22.

The cam-type operation consists of a tappet, or follower, for example of the wheel type, fastened onto the bar 12 of the lips that follows, during the rotation of the moulding carousel, the cam 800 shape, which is fixed with respect to the frame of the carousel.

The cylindrical chamber 23 is filled with an essentially fixed amount of pressurized gas, for example air or nitrogen, at an indicative pressure of 40 bars, in order to behave like a first gas spring that tends to push the bar 12 of the lips constantly upward. The operating principle of the cam 800 shape will be explained below.

Analogously, the sliding between the bar 15 for operating the plunger and the slide 22 is controlled by a cam-900 operation and by the cylindrical chamber 24, also machined from the slide 22 and filled with an essentially fixed amount of pressurized gas, for example air or nitrogen, at the indicative pressure of 40 bars.

Preferably, the bar 15 that operates the plunger 5 features a section with a larger diameter 26, FIG. 6 above and below which there are two segments 27, 28 of the bar diameter of Dsup and Dinf, respectively. The section with the larger diameter 26 connects to the two upper 27 and lower 28 segments of the bar with two flat ring-type surfaces 29 and 30, respectively orthogonal to the axis of the bar 15. Preferably, Dsup is greater than Dinf so that the force of the pressurized gas in the chamber 24 on the surfaces 29 and 30 tends constantly to push the bar 15 upward against the top end of the cylindrical chamber 24 or of the cam 900.

The wall of the cylindrical chamber 24 and the hollow presser or cylinder 16 that slides inside are formed in order to create, with the help of appropriate sealing, airtight sliding. Similar airtight sliding is created between the internal cavity of the hollow presser 16 and the plunger-holding bar 15, which slides inside. This minimizes the losses through seeping of the pressurized gas trapped inside the cylindrical chamber 24, and the hollow presser 16 and cylindrical chamber 24 assembly behaves like a second gas spring that tends constantly to push the hollow presser downward against the bottom of the second cylindrical chamber 24.

The use of gas springs offers different advantages including, for example:
  The possibility of making many gas springs, two for each compression unit 4, with more contained stiffness tolerances and with less decay due to fatigue compared to, for example, steel springs
  Simplicity and cost effectiveness of making the springs compared to a system of hydraulic cylinders piloted by valves
  The possibility of handling with a very simple device, and with relatively fast response times, relatively high pressures and compression forces, for example 40 bars on a cylinder of approximately 160 mm of diameter produce a force of more than $8 \times 10^4$ N Preferably, the top flat ring-type surface or shoulder 29 and the top wall 31 of the chamber 24 are made so that they can abut mechanically against each other and so that they can push the plunger 5 with the force of the slide 22 during the compression and mould-closing phase.

The bar 15 for operating the plunger comes out of the top part of the slide 22—which has an external contact surface 37 machined, for example, from a sliding sleeve 38—on which a corresponding contact surface 39, machined from the bar 15, comes into mechanical contact when lowered.

The slide 22 and the plunger-holding bar 15 are made so that the slide, by means of the contact surfaces 37, 39, can push the plunger 5 and the plunger-holding rod 15 when the mould 1 opens.

Figure 8:
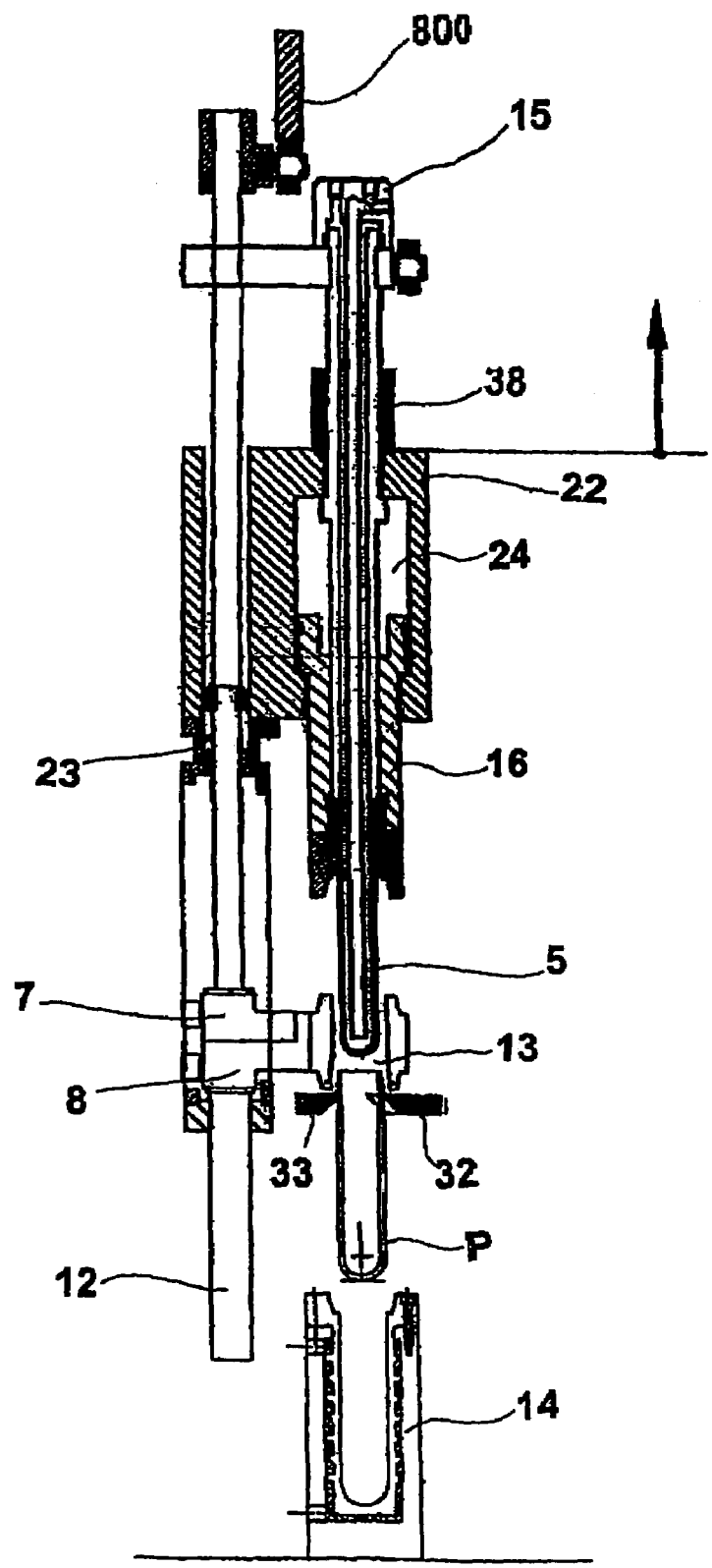

FIGS. 1 and 8 show a schematic view of part of an external device for removing parisons moulded by the moulding unit 4. The removing device features a star wheel 32 around which a concentric removing guide 33 is placed.

What follows is a description of the operation of a moulding unit 4.

FIG. 1 shows a moment in the moulding cycle when the cavity 2 of the female mould 14 has just been filled with a predetermined dose of melted plastic, for example PET.

The lips 7, 8 are in their position of maximum horizontal opening and are located slightly above the star wheel 32 and the removing guide 33; the operating bar 15 of the plunger 5 is also raised so that its bottom end is above the star wheel 32 and the removing guide 33.

The slide 22 is positioned at a height so surface 29 abuts mechanically against the top wall 31 of the chamber 24.

The pressure of the air in the chamber 24 keeps the hollow presser 16 pressed against the bottom of the chamber 24 and in its position of maximum extension outside said chamber.

Figure 2:
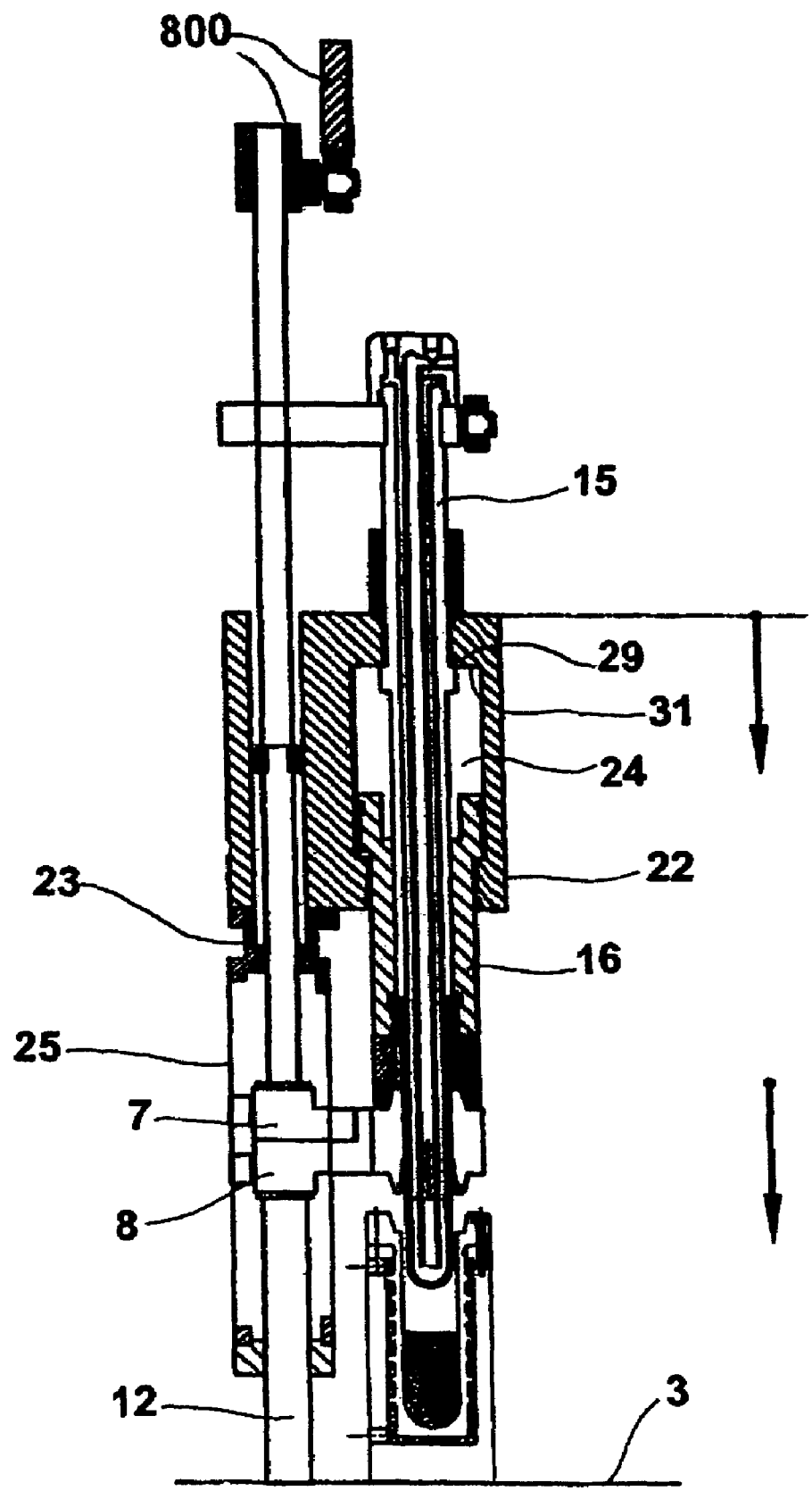

FIG. 2 shows a subsequent moment of the moulding cycle when, after making the bar 12 of the lips slide with respect to the plate 25 of the cams, the lips 7, 8 are closed and are brought—thanks to the cylindrical chamber 23 and the cam 800—into contact with the hollow presser 16. The slide 22 of the press is being lowered with respect to the mould-holding plate 3, the pressure of the gas inside the chamber 24 continues to keep the shoulder 29 of the bar 15 of the plunger in contact with the top wall 31 of the chamber, and the hollow presser 16 is in its position of maximum stroke extended outside the chamber 24; thus, the bar 15 of the plunger and the hollow presser 16 follow rigidly the lowering movement of the slide 22.

Figure 3:
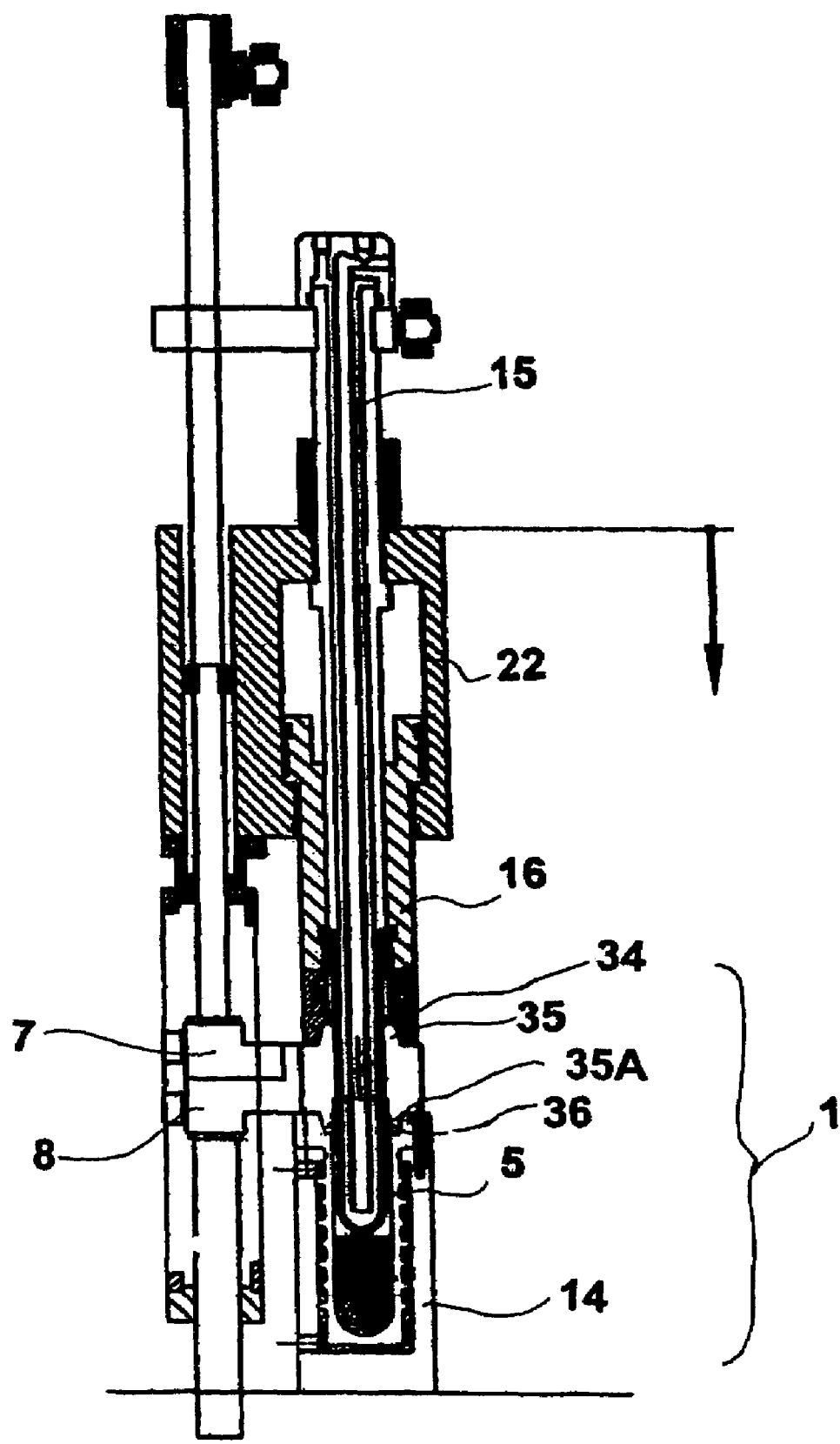

FIG. 3 shows the moment when the mould 1 closes, the moulding cavity of the mould 1 is isolated from the external environment, and the lips 7, 8 come into contact with the top edge of the female mould 14 and are compressed by the hollow presser 16; also the horizontal opening of the lips 7, 8 is prevented by coupling the surfaces of the lips in the shape of a truncated cone 35, 35A with the corresponding surfaces of the hollow presser 16 and of the female mould 14 in the shape of a truncated cone 34, 36. The lips 7, 8 remain in this status also in the moments shown in FIGS. 4, 5, 6.

Returning to FIG. 3, the mould is preferably closed before the plunger 5 starts to immerse itself in the fluid plastic in order to prevent splashing or similar when the mould is still open.

Until now the slide 22, the hollow presser or cylinder 16, the bar 15 of the plunger, and the lips 7, 8 have been lowered independently from each other.

Figure 4:
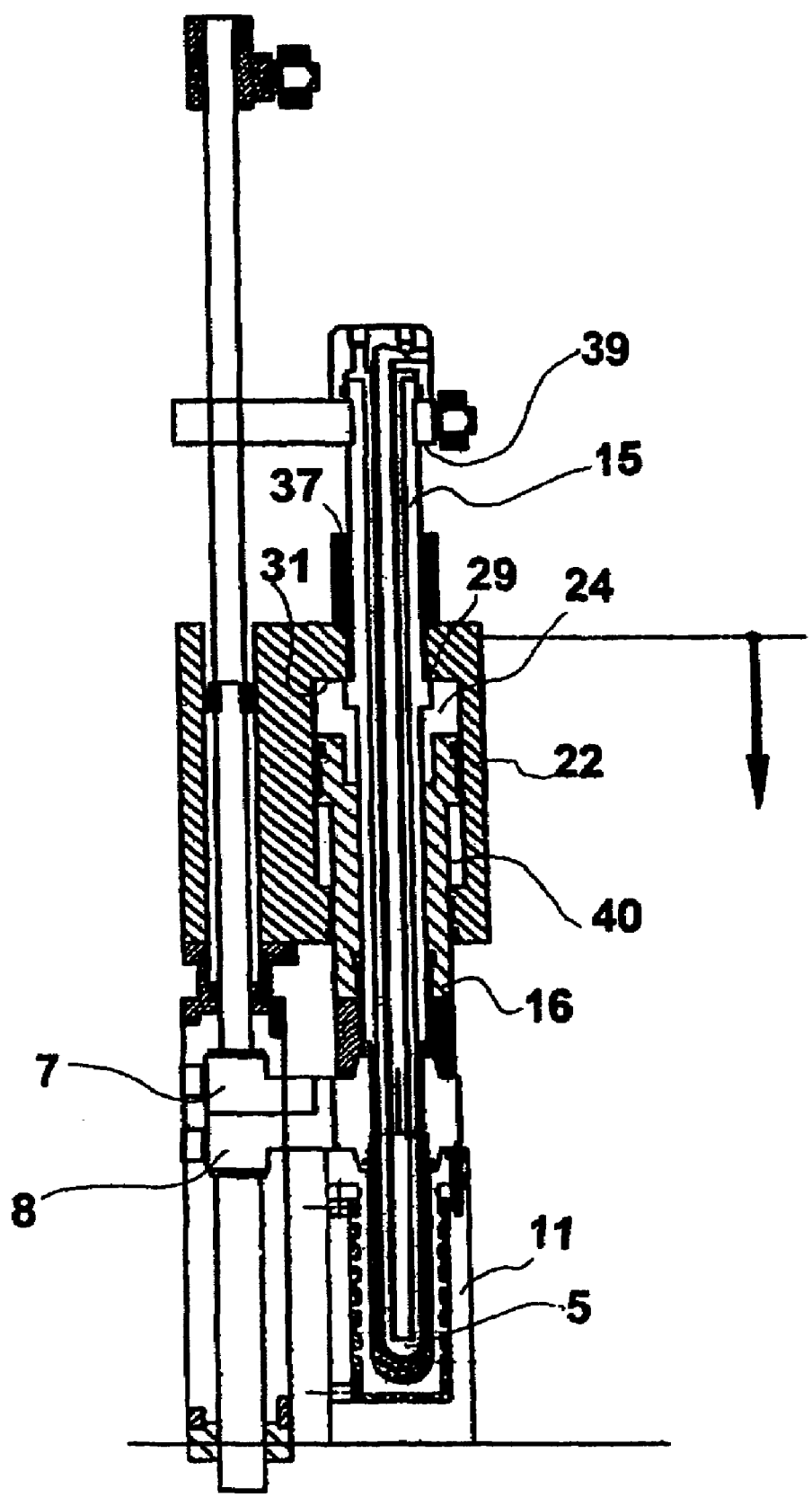

FIG. 4 shows a next moment when the hollow presser 16 remains immobile compared to the female mould 14 and continues to press against the lips, blocking them; the slide 22 continues to lower itself and, since the shoulder 29 is in contact with the top wall 31 of the chamber 24, pushes the bar 15 of the plunger downward; the plunger 5 has been immersed in the fluid plastic making it occupy the entire moulding cavity and expelling, through appropriate blowholes, all the air that was inside.

The blowholes, and the sliding opening between the plunger 5 and the hole 13 of the closed lips, are of a size and thickness suitable to let air pass but trap the fluid plastic.

When the air has been totally expelled, there is a definite increase in the resistance to let the plunger 5 lower further. The lowering of the slide 22 and, consequently, of the plunger 5 when this is immersed in the fluid plastic is controlled by means of a logical unit and appropriate sensors or equivalent control devices of the mechanical, pneumatic, or other type. This serves to apply on the plunger 5 a pushing force never greater than the maximum force, which once exceeded immediately stops or slows down the lowering of the plunger 5, continuing anyhow to apply on the melted plastic said maximum force; this is equal to compressing the plastic in the mould with a pressure limited to a maximum value. Said maximum push value is chosen in order to make the air come out completely from the closed moulding cavity while preventing the melted plastic from being extruded through the blowholes.

Figure 5:
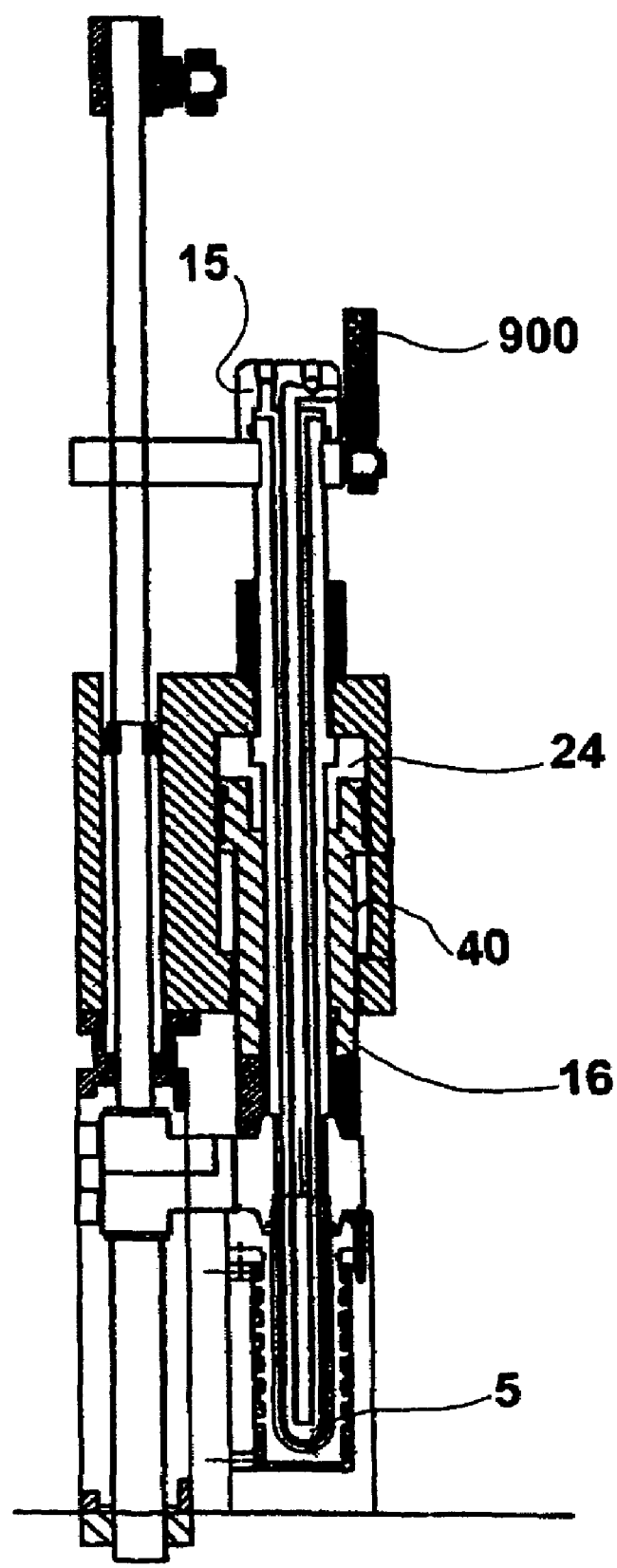

In the next moments, between the one of FIG. 4 and the one of FIG. 5, the plunger 5 continues to apply on the plastic an appropriate compression force in order to make the plunger 5 sink further into the plastic at a slower rate. This rate depends on the contraction in volume of the plastic due to its cooling; the goal being to push the plastic against the walls of the moulding cavity to compensate for the thermal shrinkage due to the cooling.

Figure 9:
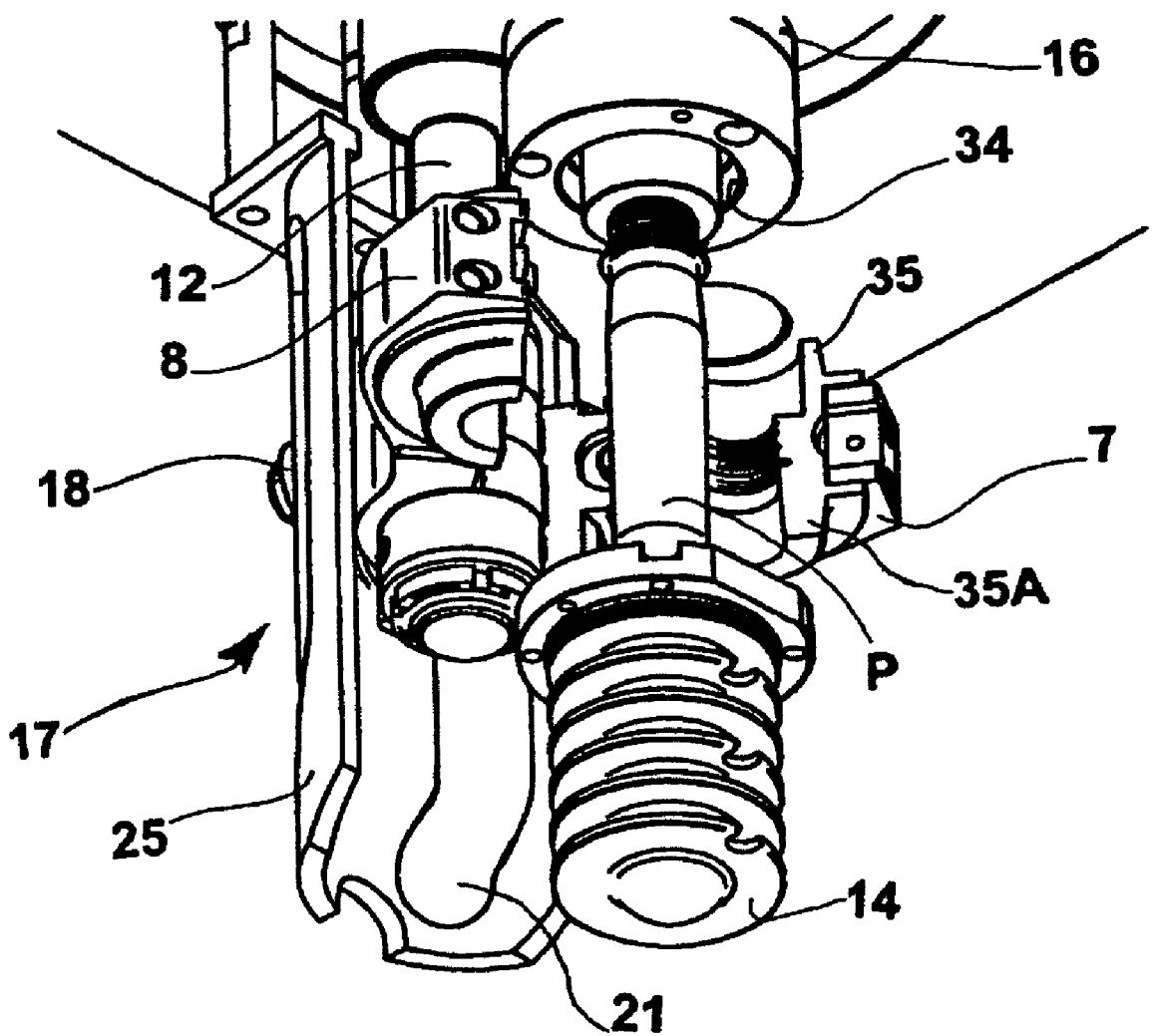
FIG. 9 shows a perspective view of a detail of the device shown in FIG. 1.
Figure 10:
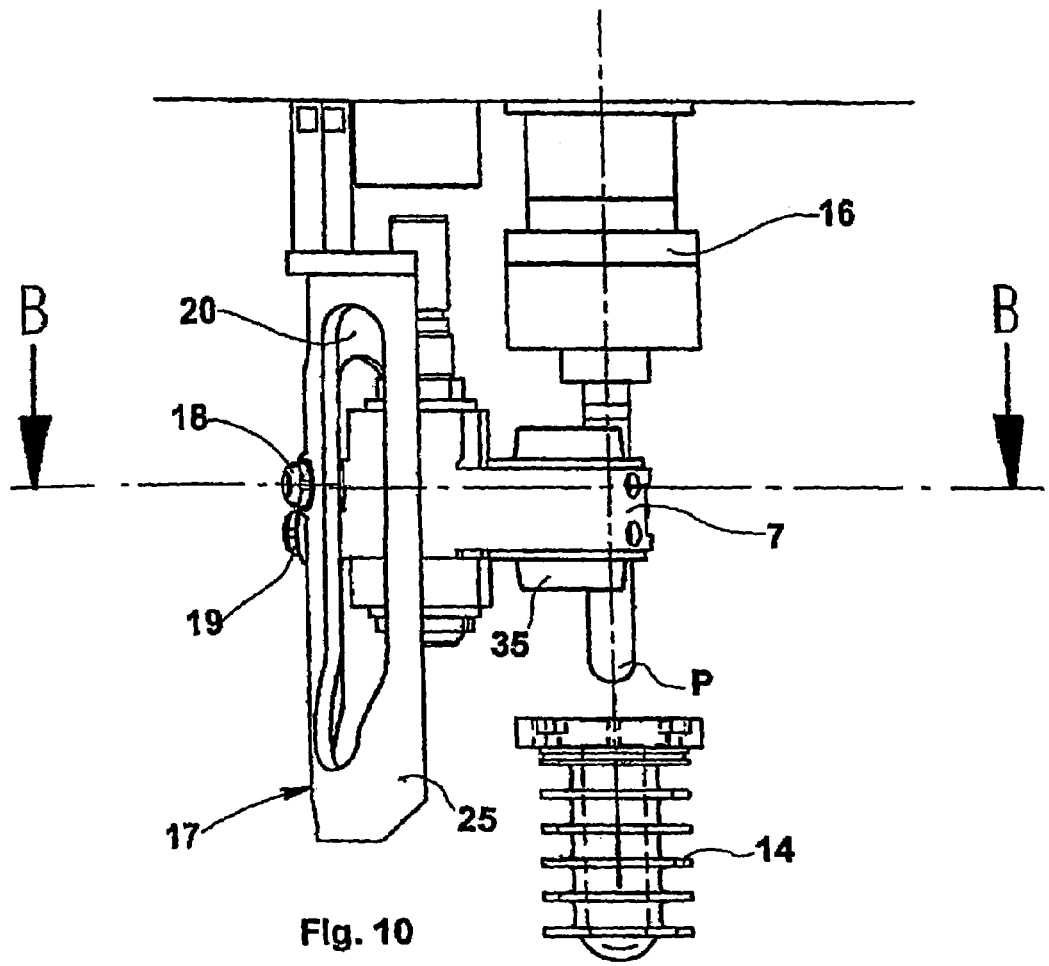
FIG. 10 shows a side view of the detail shown in FIG. 9.

This sinking, in the case of parisons of the type shown in FIG. 9, can be indicatively of 3 to 7 mm depending also on the dimensions of the parison. During sinking, the bar 15 of the plunger continues to be pushed downward by the slide 22 since the top shoulder 29 remains in contact against the wall 31 of the chamber 24 of the slide. The hollow presser 16 continues to enter into the chamber 24, pressing against the lips that rest in turn on the female mould 14.

In FIGS. 4 and 5, the chamber 40—formed by the bottom shoulder of the hollow presser 16, its sides, and the side walls of the chamber 24—communicates with the external atmosphere.

This phase is stopped, for example, after a predetermined time, or when the estimated temperature of the plastic material in the mould is sufficiently low.

With dimensional tolerances of the different elements of the mould and the dose of the plastic deposited in the mould sufficiently precise, it is possible to achieve, when the sinking of the plunger 5 is stopped FIG. 5 and the moulded plastic object is removed from the mould, a workpiece with the desired shape and dimensional tolerances.

Figure 6:
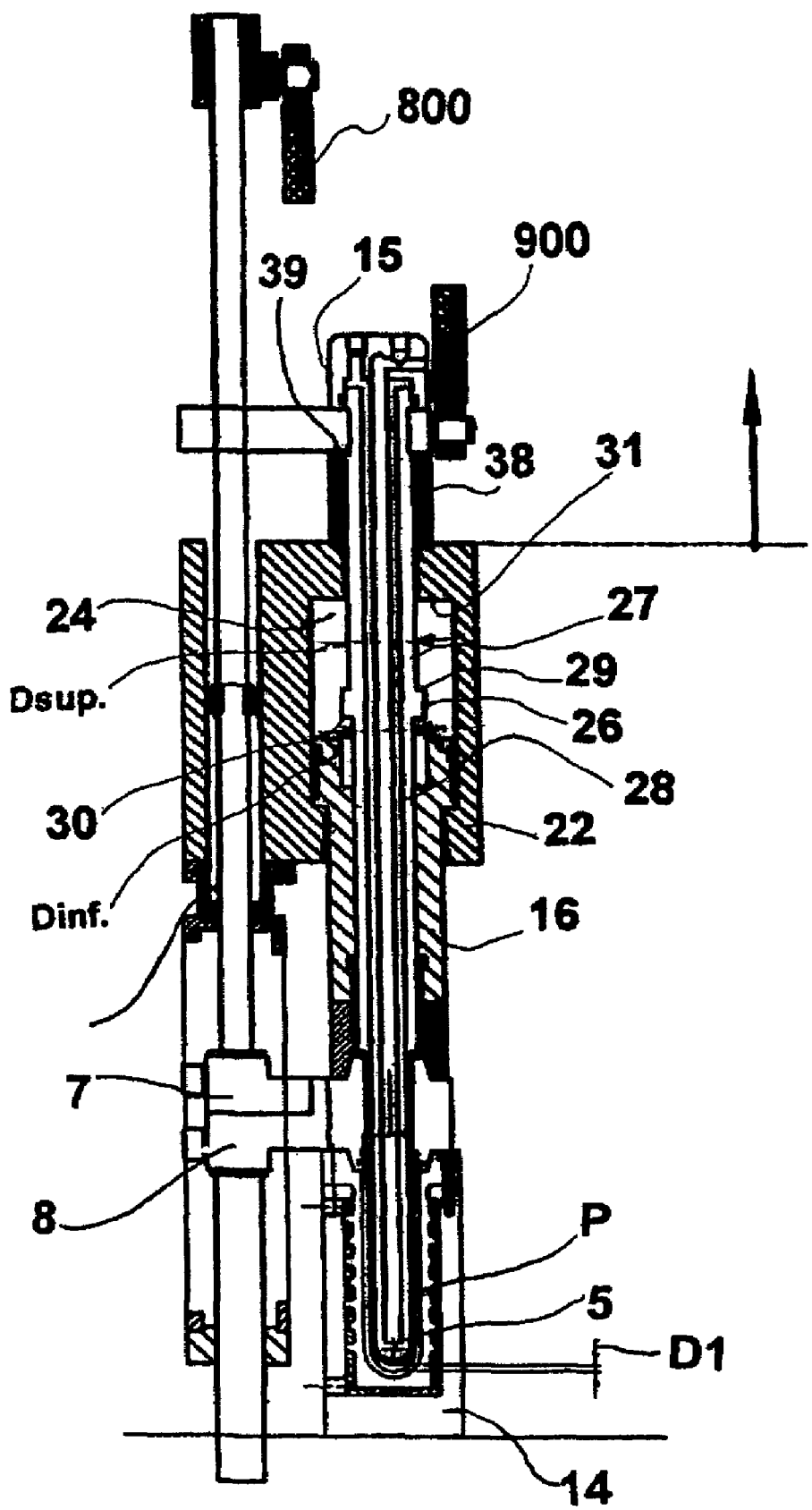
Figure 7:
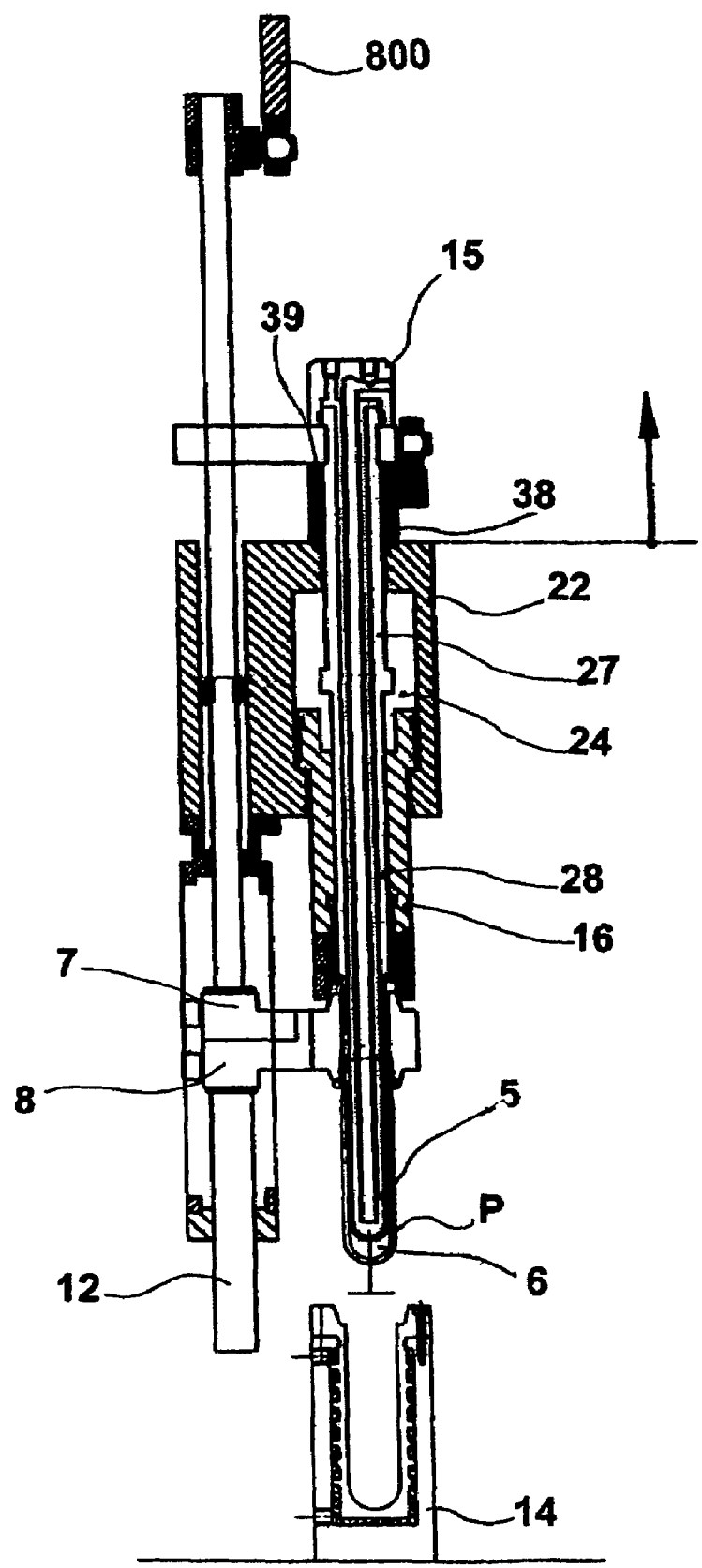

The next FIGS. 6 to 8 refer to the operations of opening the mould and removing the moulded object.

When the plastic in the mould is sufficiently cool, the plunger 5 is no longer sunk into the mould. Now, the plunger 5 is detached from inside the parison P: the hollow presser 16 continues to press the lips 7, 8 downward and against the female mould 14, the slide 22 is lifted and the bar 15 of the plunger remains still and blocked for the time being with respect to the parison P. When the contact surface 37 of the tubular sleeve 38 abuts against the contact surfaces 39 of the bar 15 of the plunger, the latter is raised with significant force by the slide 22; the plunger 5 is detached from the internal cavity 6 of the parison P FIG. 6, which is firmly held by the lips 7, 8. Preferably, this first raising of the plunger 5 from the cavity 6 of the parison is stopped after a few millimeters in order to have a first limited stroke, as will be clarified below.

Carrying out the initial detachment of the plunger 5 from the parison with the driving force of the slide 22 and the contact surface 37, makes it possible to size the Dsup and Dinf diameters in the segments 27, 28 of the bar 15 in order to have relatively small push values of the gas in the chamber 24 on the plunger-holding bar 15. Said values are such that they do stress excessively the cam 900 but are sometimes insufficient to detach with the only hydrostatic affect the plunger 5 from the parison P. Said release force can be, for example, even of 400 daN.

Then, the lips 7, 8 are lifted following the upward movement of the slide 22 and of the bar 15 of the plunger so that there is no sliding between the parison P, the plunger 5, and the lips 7, 8.

In order to do this the bar 15 of the plunger continues to abut against the tubular sleeve 38, the hollow presser 16 continues to press against the bottom wall of the chamber 24, and the bar 12 of the lips 7, 8 is pushed upward and kept abutting against the hollow presser 16 by the pressurized gas in the chamber 23. The cam 800 acts as safety if this push is inadequate to lift the lips; the cam 900 prevents the plunger-holding bar 15 from rising too fast and too much, hindering the upward push on the bar 15 given by the pressurized gas in the cylindrical chamber 24.

The three sliding elements 12, 15, 16 rise together with the slide 22 and the parison is completely removed from the female mould 14.

The bar 12 of the lips stops its upward movement FIG. 7 when the parison P is located at an appropriate/predetermined height in order to be ready to be gripped by a removing device, which includes the removing star wheel 32 and the removing guide 33. Ideally, the lips 7, 8 do not change substantially said position in height during the next phases.

Then, FIG. 7, the bar 12 of the lips and the cams on the plate 25 slide slightly one compared to the other in order to open the lips 7, 8 slightly.

The plunger 5, already detached from the cavity 6 of the parison, is still almost completely inside said cavity. When the two lips 7, 8 are opened, the plunger 5 constrains the horizontal movements of the parison P in order to detach the threading and ring areas of the parison from both lips, instead of just from one lip. The opening of the lips in this phase is limited so that these still hold the ring of the parison and do not allow it to fall.

The cam 900 contrasts the upward push of the gas in the chamber 24 on the plunger-holding bar 15, keeping the shoulder 29 detached from the top back wall of the chamber 24.

FIG. 8 shows a next moment of the release of the parison: the rotation of the moulding carousel moves the parison P—held by the lips 7, 8 almost at the same height of FIG. 7—in the field of action of the removing device 32, 33.

With an adequately fast movement—controlled by the cam 900 and helped by the upward push of the gas of the cylindrical chamber 24—the plunger 5 is removed completely from the parison P; then, the lips 7, 8 are completely opened releasing the parison, which can be grasped by the star-removing device 32, 33, removed by the moulding unit 4 and transferred to the transport or processing stations after the moulding carousel.

In the version shown in FIGS. 7-8, the length H of the cylindrical chamber 24 is insufficient to enable the complete removal of the plunger 5 from the parison P exclusively making the surface 29 of the plunger-holding bar abut against the top back wall of the chamber 24; thus, it is necessary to help the extraction of the plunger 5 by lifting the slide 22 from the position shown in FIG. 7 to the one in FIG. 8.

At the end of the moulding cycle, in FIG. 8, the different moving elements of the moulding unit 4 are found in the same positions as in FIG. 1, ready to carry out a new compression cycle.

Carrying out the detachment of the plunger 5 from the internal cavity 6 of the parison as first release operation, and in particular when the lips 7, 8 are still solidly closed by the hollow presser 16 prevents sticking between the plunger 5 and the internal walls of the lips; thus, the coupling between the lips/plunger 5 can be realized with very small diameter tolerances.

Delaying the complete removal of the plunger 5 until almost the end of the moulding cycle makes it possible to detach the parison from the lips 7, 8 preventing this from sticking; and it is possible to unload the parison from a rotating moulding machine with many moulding units 4 operating continuously.

The fact of positioning the lips 7, 8, since the phase shown in FIG. 7, at the height at which the parison P will be gripped by a removing device such as the star wheel 32 facilitates and speeds up the unloading of the moulded parison. For example, this is a better solution compared to the system FIG. 10 of letting the moulded parison fall by opening the lips 7, 8 in a predetermined unloading and removing position. Furthermore, this solution allows the parisons to be removed from the mould at a higher temperature and when the plastic material has not yet hardened completely.

Having the plunger 5 fastened on a plunger-holding bar 15 sliding both with respect to the hollow presser 16 and the slide 22, makes it possible firstly to extract the plunger faster from the parison P when removing it with the star wheel 32 or other removing devices, in FIG. 8. Making the plunger 5 and the plunger-holding bar 15 with appropriately reduced weight and inertia makes it easier to lift quickly—at least for a segment of the stroke—only the plunger-holding bar 15 instead of the entire slide 22.

Secondly, this makes it possible to operate the hollow presser or compression cylinder 16 with a simple cylindrical chamber 26 acting as a gas spring 24—or with a system of steel springs or other elastic similar elements—without having to resort to a hydraulic or pneumatic cylinder and relating supply and control circuit. Obviously, this makes it significantly simpler and cost effective to realize numerous compression units 4, which are still able to operate the hollow presser 16 with high compression forces.

The version described above can undergo several changes and still remain within the scope of this invention.

For example, the internal cavity 6 of the parison P or other hollow object can be shaped with multiple plungers 5—meaning a plunger 5 consisting of several moving elements, instead of a single plunger 5; the lips 7, 8 can be blocked and kept closed, during the further lowering of the plunger 5, with fastening devices fasted onto the bottom mould-holding plate 3 instead of onto the top slide 22; similarly, the slits 20, 21 of the cam for controlling the opening and closing of the lips 7, 8, or the sliding housings of the bar for lifting the lips can be fastened onto a different support from the slide 22, for example, onto the bottom mould-holding plate 3 instead of on the slide 22 or other; the lips 7, 8 or other elements that open with a movement transversal to the main opening direction of the mould in order to enable the removal of undercut parts can be more or less than two, or can be formed by one or more elements that make it possible, for example, to remove a threaded moulded part with an unscrewing rotation parallel to the axis of the thread; and, finally, the mechanical operating parts can be replaced with electric, oleo, or other type of controls.

The invention claimed is:

1. A device for compression moulding plastic containers (P), having an internal cavity (6) communicating with the outside through an opening comprising a mould (1) with a plunger (5) to shape at least part of said internal cavity (6) of the container (P), a female mould (14) to shape part of the external surface of the container (P), being able to reach a reciprocal coupling position in order to shape the container (P) by sliding in the opening or closing direction of the mould (1), and at least two moving mould completion elements (7, 8) to finish said external surface of the moulding cavity, said device also including a slide (22), being able to slide in the opening or closing direction of the mould, the slide being provided with a cylindrical cavity (24) and a cylinder (16) able to slide inside the cylindrical cavity (24) in the opening or closing direction of the mould and to keep the mould (1) in the closed position by applying a retaining force on said mould completion elements (7, 8), and characterised in that it comprises means for operating the plunger so that said plunger (5) can slide along the opening or closing direction of the mould (1) inside the cylinder (16) for at least a segment of its length with respect to said cylinder (16) and said slide (22), and means for applying an appropriate continuous compression force on said plunger (5) in order to further sink said plunger into the plastic, depending on the contraction in volume, in order to compensate for thermal shrinkage during cooling.

2. A device as claimed in claim 1, wherein said completion elements (7, 8) move by moving away transversally to said opening and closing direction of the mould in order to detach from the moulded container (P).

3. A device as claimed in claim 2 wherein the slide (22) and the plunger (5) feature relating first contact surfaces (29, 31) apt to abut against each other during the mould-closing and compression operations in order to slide solidarily.

4. A device as claimed in claim 3 wherein the slide (22) and the plunger (5) feature relating second contact surfaces (37, 39) are adapted to abut against each other reciprocally during the mould-opening operation in order to slide solidarily.

5. A device as claimed in claim 4 where said cylinder (16) comprises a portion shaped as piston that slides inside said cylindrical chamber (24) containing gas in order to create a gas spring.

6. A device as claimed in claim 5 wherein the plunger (5) in the segment found inside said chamber (24) features two segments of its length of a different diameter.

7. A device as claimed in claim 6 wherein said completion elements (7, 8) are able to slide along a direction parallel to the opening and closing direction of the mould in order to move nearer and further away from the female mould (14) and/or from the slide (22) during specific phases of the moulding operation.

8. A device as claimed in claim 7 wherein said opening and closing and sliding movements of the completion elements (7, 8) are controlled by a cam-type device fastened to the sliding slide (22).

* * * * *